(12) United States Patent
Sodhi et al.

(10) Patent No.: US 11,436,237 B2
(45) Date of Patent: Sep. 6, 2022

(54) RANKING DATASETS BASED ON DATA ATTRIBUTES

(71) Applicant: International Business Machines Corporation, Armonk, NY (US)

(72) Inventors: Manjit Singh Sodhi, Bangalore (IN); Kalapriya Kannan, Bangalore (IN); Poornima Iyengar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 17/125,935

(22) Filed: Dec. 17, 2020

(65) Prior Publication Data

US 2022/0197914 A1    Jun. 23, 2022

(51) Int. Cl.
*G06F 7/08* (2006.01)
*G06F 16/2457* (2019.01)

(52) U.S. Cl.
CPC .......... *G06F 16/24578* (2019.01); *G06F 7/08* (2013.01)

(58) Field of Classification Search
CPC ............................ G06F 16/24578; G06F 7/08
See application file for complete search history.

(56) References Cited

U.S. PATENT DOCUMENTS

| | | | |
|---|---|---|---|
| 10,296,658 B2 | 5/2019 | Le Biannic | |
| 10,339,147 B1* | 7/2019 | Barmes | G06N 5/046 |
| 10,528,522 B1 | 1/2020 | Todd | |
| 2008/0317217 A1* | 12/2008 | Bernardini | H04L 43/00 379/32.03 |
| 2016/0328406 A1 | 11/2016 | Convertino | |
| 2017/0147583 A1* | 5/2017 | Buchmann | G06F 16/24578 |
| 2017/0293671 A1 | 10/2017 | Korn | |
| 2019/0108230 A1* | 4/2019 | Prakash | G06F 16/24578 |
| 2019/0114354 A1* | 4/2019 | Orun | G06F 16/24578 |
| 2020/0409945 A1* | 12/2020 | Chen | G06F 16/24578 |
| 2021/0279043 A1* | 9/2021 | Egenolf | G06F 16/254 |

OTHER PUBLICATIONS

Chmielinski, et al., "The Data Nutrition Project", © 2018, last printed Dec. 16, 2020, 18 pages, <https://datanutrition.org/>.

(Continued)

*Primary Examiner* — Robert W Beausoliel, Jr.
*Assistant Examiner* — Pedro J Santos
(74) *Attorney, Agent, or Firm* — Michael A. Petrocelli

(57) ABSTRACT

Ranking a group of datasets using a computer includes determining a set of target data fields from a set of process documents that indicate user data field preferences. A set of target dataset attributes from a set of data use documents indicate user data scope preferences. A plurality of metadata sets for an associated plurality of datasets the computer determines having a field suitability value exceeding a predetermined suitability threshold value. The FSV represents a degree of similarity between a set of fields associated with said dataset and the set of target data fields. The computer assesses metadata sets with regard to the target attributes and generates a compared attribute score for each candidate dataset. A degree of likelihood is indicated that an associated dataset will have content exhibiting said target dataset attributes. The computer candidate datasets is based on the compared attribute score.

20 Claims, 10 Drawing Sheets

(56) References Cited

OTHER PUBLICATIONS

Gebru, et al., "Datasheets for Datasets", arXiv:1803.09010v7, Mar. 19, 2020, 24 pages, <https://arxiv.org/abs/1803.09010>.
Holland, et al., "The Dataset Nutrition Label: A Framework to Drive Higher Data Quality Standards", arXiv: 1805.03677, Draft May 2018, 21 pages, <https://arxiv.org/abs/1805.03677>.
Mell, et al., "The NIST Definition of Cloud Computing", National Institute of Standards and Technology, Special Publication 800-145, Sep. 2011, 7 pages.
Mitchell, et al., "Model Cards for Model Reporting", arXiv: 1810.03993v2, Jan. 14, 2019, 10 pages, <https://arxiv.org/abs/1810.03993>.

* cited by examiner

| /datavalue |
| --- |
| { |
| Dataset id |
| Data facets: [] |
| Business Questionnaire: [] |
| Business process diagrams: [] |
| } |
| |
| /dataranking |
| { |
| Dataset id: [] |
| Facet Ranking: [] |
| Business questionnaire: [] |
| Business process diagrams: [] |
| } |

Sample Embodiment
600

FIG. 6

Questionnaire:

a) What attributes would you prefer to gather.
b) What is the domain of your data?
c) What analytics you are expecting to be done on your data set?
d) Is it time series data analytics?
e) Is it classification
f) Is it predictive in nature
g) What is the number of records required.

Sample answers:

a) Columns indicating performance attritions.
b) Accounting
c) Attrition analytics
d) No
e) Yes
f) Yes
g) 20000

RANKING DATASETS BASED ON DATA ATTRIBUTES

BACKGROUND

The present invention relates generally to the field of dataset analysis and, more particularly, to computer dataset evaluation.

Datasets are groups of data that can be used by various computer systems to provide answers to questions about many real-world and simulated situations. Often, datasets include information about past transactions or other historic information from which predictions about similar current and future transactions may be made. In some domains, datasets are produced by user systems as a byproduct of system operation and kept future use. In other domains, datasets, especially large or customized datasets, may be provided by third parties at an expense to the user. Artificial Intelligence (AI) systems can identify patterns within data contained in datasets to reveal trends that are often difficult to predict in other ways. Since datasets can vary widely in terms of content, some datasets will be more useful to certain users than others.

The value of a dataset can vary from use case to use case. It is possible to evaluate the worth of datasets and to rank evaluated datasets if an intended use of the data is known.

SUMMARY

According to one embodiment, a computer-implemented method to sort a plurality of datasets according to dataset attributes, includes identifying, by a computer, a set of target data fields from a set of process documents, the process documents indicating data field preferences of a user. The computer identifies a set of target dataset attributes from a set of data use documents, and the data use documents indicate data scope preferences for the user. The computer generates a group of metadata sets for an associated plurality of datasets. The computer determines candidate datasets having a field suitability value that exceeds a predetermined suitability threshold value, and the field suitability value represents a degree of similarity between a set of fields associated with said dataset and the set of target data fields. The computer assesses the associated metadata set for each candidate dataset, with regard to the target attributes. The computer generates a compared attribute score for each candidate dataset that indicates a degree of likelihood that an associated dataset will have content exhibiting said target dataset attributes. The computer generates a list of said candidate datasets sorted by the compared attribute scores.

According to aspects of the invention, the data use documents include information in a format selected from a list consisting of Business Process Execution Language (BEPL), and Unified Modeling Language (UML). According to aspects of the invention, the data target attributes are extracted from elements of said process documents, selected from a list consisting of class diagrams, activity diagrams, sequence diagrams, and component diagrams. According to aspects of the invention, a candidate dataset having a highest compared attribute score is designated as a selected dataset. According to aspects of the invention, establishing a set of search parameters for a search to be conducted on said selected dataset; and updating a historic use field in the metadata set associated a dataset selected for searching with a search context value that represent aspects of the search parameters. According to aspects of the invention, the ranking is based, at least in part, on the historic use field values.

According to aspects of the invention, the compared attribute scores are based, at least in part on an associated desirability value associated with each of said target dataset attributes. According to aspects of the invention, the sets of metadata include information selected from a list consisting of: domain, gender, age group, geographic distribution, demographic distribution, statistical ranges of numerical values, and context of applicability.

According to another embodiment a system to rank a plurality of datasets, which comprises: a computer system comprising a computer readable storage medium having program instructions embodied therewith, the program instructions executable by a computer to cause the computer to: identify a set of target data fields from a set of process documents, said process documents indicating data field preferences of a user; identify a set of target dataset attributes from a set of data use documents, said data use documents indicating data scope preferences for said user; generate a plurality of metadata sets for an associated plurality of datasets; determine candidate datasets having a field suitability value that exceeds a predetermined suitability threshold value, said field suitability value representing a degree of similarity between a set of fields associated with said dataset and the set of target data fields; assess the associated metadata set for each candidate dataset, with regard to the target attributes and generating, by said computer, a compared attribute score for each candidate dataset, indicating a degree of likelihood that an associated dataset will have content exhibiting said target dataset attributes; and generate a list of said candidate datasets sorted by said compared attribute scores.

According to another embodiment, a computer program product to rank a plurality of datasets, the computer program product comprising a computer readable storage medium having program instructions embodied therewith, the program instructions executable by a computer to cause the computer to: identify, using a computer, a set of data target attributes from a set of process documents that indicate the data field preferences of a user; identify, using said computer, a set of dataset target attributes from a set of data use documents that indicate data scope preferences of the user; generate, using said computer, a plurality of metadata sets for an associated plurality of datasets; determine, using said computer, a top-k candidate datasets having a field suitability value that exceeds a predetermined suitability threshold value; assess, using said computer, the associated metadata set for each candidate dataset, with regard to the target attributes and generating, by said computer, a compared attribute score for each candidate dataset; and rank, using said computer, said candidate datasets based, at least in part, on said compared attribute score.

The value of a given dataset can be based on a variety of factors, including dataset record field content and the scope of the information contained. For example, many data analysis systems require certain kinds of information (e.g., certain fields) in order to provide meaningful output, and datasets with higher amounts of suitable information (e.g., the higher number of desired data fields) are preferred over datasets with fewer required data fields. Similarly, data analysis systems need data that is suited to the questions being presented to the system in order to provide meaningful output, and the more relevant a given dataset is to an intended scope of use (e.g., anticipated questions to be asked), the higher the dataset value.

Aspects of the invention match data requirements (including Target Data Fields and Target Dataset Attributes) of a user, including those with business applications should be matched against metadata derived from the data in the datasets. According to aspects of the invention, the metadata should represent the dataset content, describing data content demographics and statistical properties of the data content.

Aspects of the invention relate the fields of the data with meanings through a variety of methods, including ontology use and key value pair use.

Aspects of the invention first select a group of provide a score for the data set based on the target dataset requirements and its matching to the meta-data by which business can evaluate which data set is more suited for their requirements.

According to aspects of invention, the derived metadata includes: Statistical properties (e.g., the type of distribution, mean, variance and related properties, any correlations; and whether it has time-series data); The various fields and their related meanings/semantics (e.g., in a loan approval dataset, "spouse" is similar to "wife" and "husband"; if a ".CSV" file and the associated schema is known, then various meanings (e.g., fields related to opening new marketing channels might have certain meanings that are different than similarly-named fields used to identify fields associated with sporting events) suited to the schema can be recorded as metadata; when used in accordance with consent and permission granted by an individual identified, Personally Identifiable Information (e.g., emails, phone numbers, addresses/contact details); fields related to previous dataset use (e.g., via historical mining of the data set usage and identifying other data sets with which it has been used); derived metadata also includes information about the content representations like domain, gender, age group, geographic distribution (this can indicate that a dataset is applicable for certain age groups, the banking domain, or for certain regions, etc.).

Aspects of the invention determine a dataset a value based on dataset content (e.g., as characterized by dataset metadata). According to aspect aspects of the invention metadata includes descriptive information indicating content-based characteristics of the dataset. Aspects of the invention identify the data requirements of the businesses. Aspects of the invention rank datasets and provide relevance scores based on attributes and range values for each of the metadata and its range of values. Aspects of the invention formulate and derive a systematic method for determining a value for the dataset based on the business requirements and the content of the data. Aspects of the invention use the score and derive a ranking for each facets of the metadata. Aspects of the invention use the dataset value to compare two data sets with respect to a business requirement. Aspects of the invention enable a search mechanism of the data sets based on the content of the data. Aspects of the invention use the history of data usage in different contexts to generate metadata and use them to identify business context when search events are conducted. Aspects of the invention searches a corpus of data sets based on the input of a set of business requirements; and ranks the results in terms of those best matched for suitability. According to aspects of the invention, Target Data Fields (e.g., to support required business processes are defined through various diagrams using standard formats (e.g., Business Process Execution Language (BPEL) which can provide extractable activities, actors, ordering/sequences; and Unified Modeling Language (UML) that provides diagrams for relevant software engineering artifacts.) According to aspects of the invention, UML documents can include provides class diagrams, activity diagrams, sequence diagrams, and component diagrams.

According to aspects of the invention, activities from BPEL diagrams can be matched to a UML activity diagram and used to extract class level components. According to aspects of the invention, class level components can give all the requirements of the fields.

Aspects of the invention can derive Business Requirements. Aspects of the invention can evaluate datasets and metadata. Aspects of the invention can rank datasets, data values, and data facets. Aspects of the invention can help determine if a given dataset is relevant to providing information regarding how to open a mobile or online commerce channel for a business, using a questionnaire (or other data use documents that indicate data requirements).

Since datasets having content with some attributes may be more useful than others, aspects of the system (including, e.g., user data requirement questionnaires and other data use documents) help us identify what a user needs as content. Aspects of the invention identifies relevant contexts of data, indicating which datasets would be a good match for various user goals (e.g., launch new tea product using coupons, etc.).

According to some aspects of the invention, the PDAM includes a "discovery unit" that locates Activity Diagrams and a Class Diagram Locator. According to some aspects of the invention, the PDAM includes an entity extractor and an activity extractor.

According to some aspects of the invention, the term attribute may be used interchangeably with the word facet. According to aspects of the invention, the CAAM includes an otology mapping engine. According to aspects of the invention, the CAAM includes aspects that determine whether a dataset matches a business need. According to aspects of the invention, the HULUM 124 includes a data usage metadata extractor and a dataset historic use log that indicates historical data set usage and identifies other datasets with which a selected dataset has been used.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 6 is a schematic representation of aspects of "datavalue" entry and a "dataranking" entry generated according embodiments of the present invention.

FIG. 7 is an exemplary business data use questionnaire and associated sample answers according embodiments of the present invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
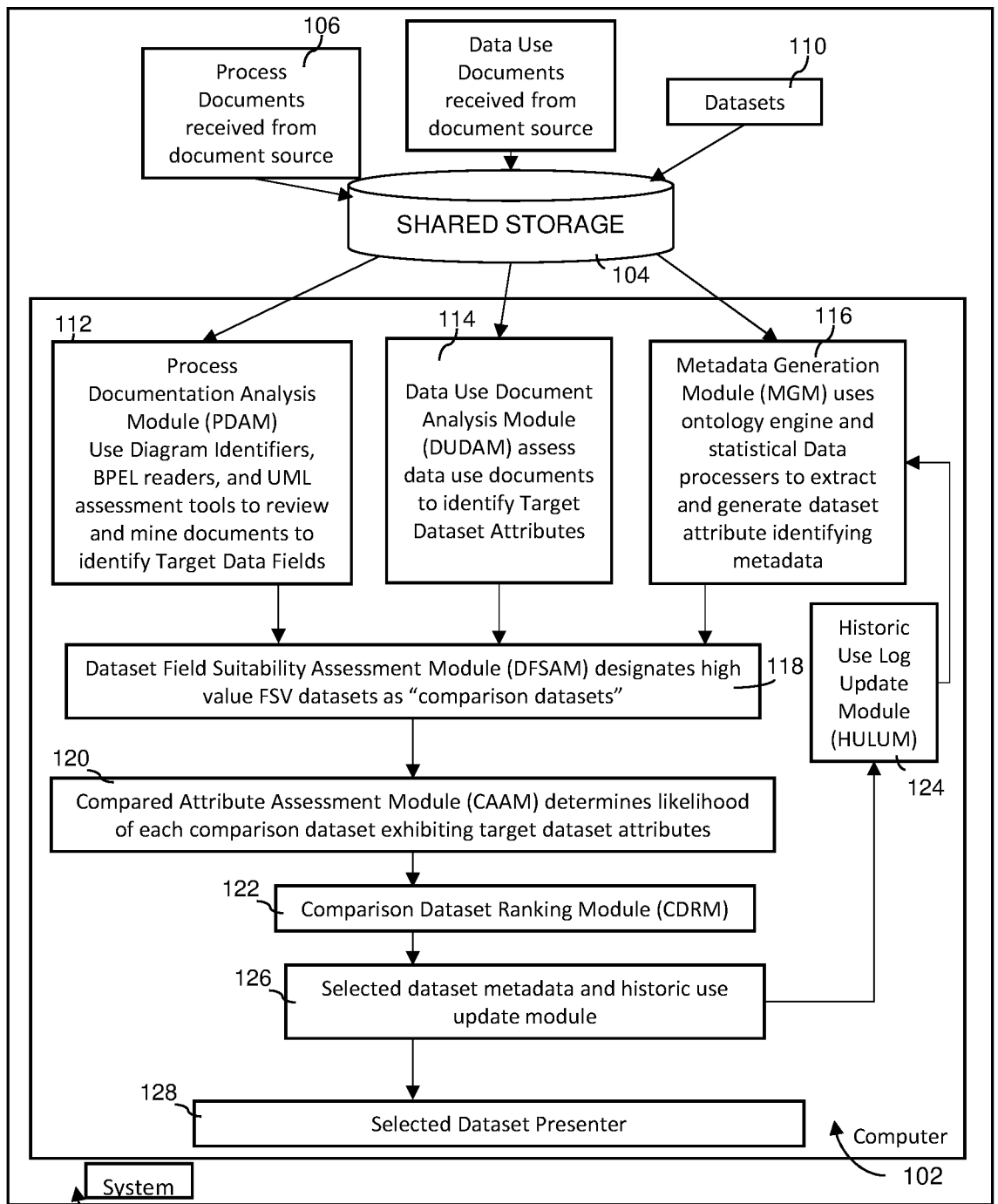
FIG. 1 is a schematic block diagram illustrating an overview of a system for computer-implemented method to rank a plurality of datasets in accordance with dataset content and desired data attributes according to embodiments of the present invention.
Figure 2:
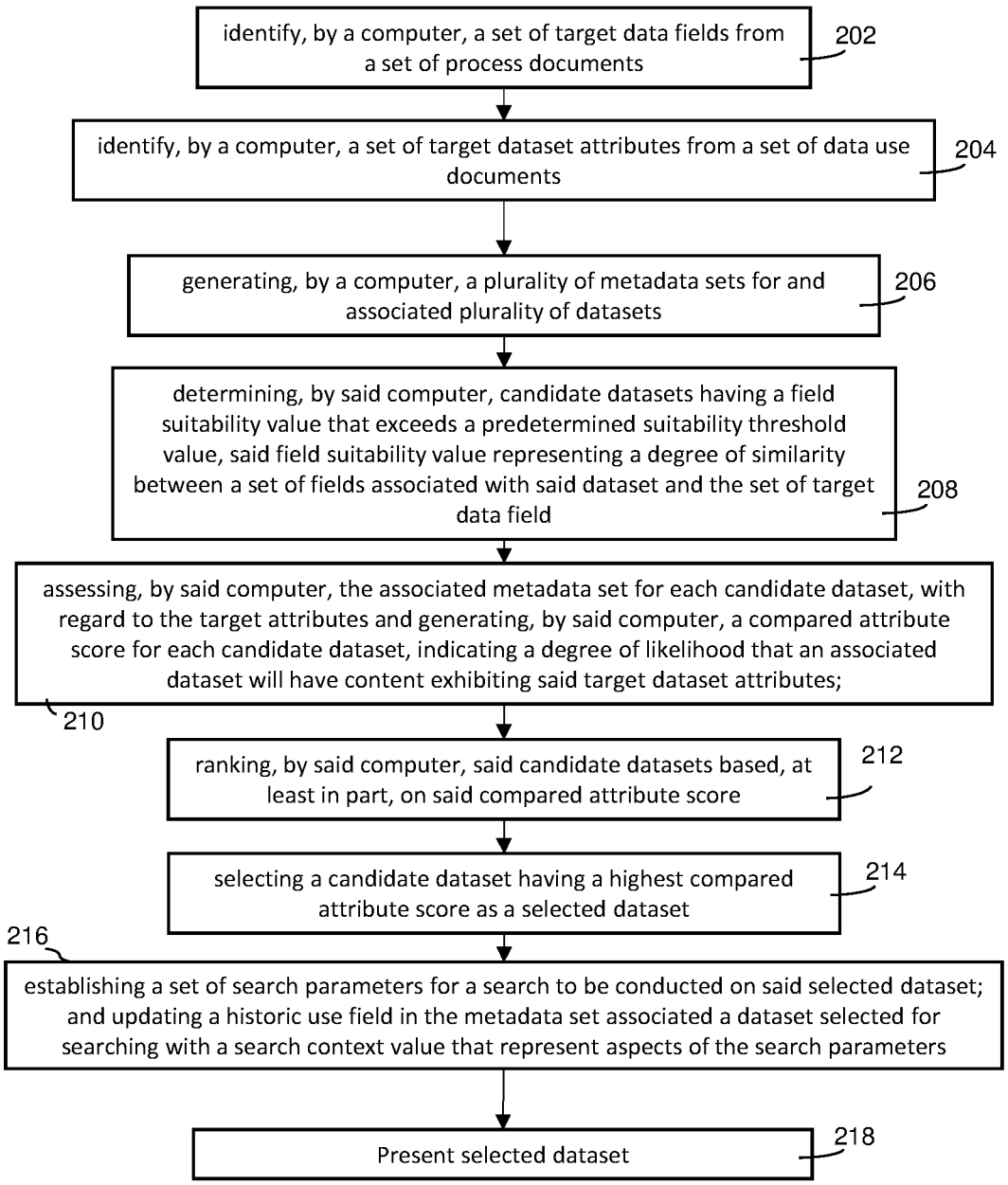
FIG. 2 is a flowchart illustrating a method, implemented using the system shown in FIG. 1, of a system for a computer-implemented method to rank a plurality of datasets in accordance with the present invention.

Now with combined reference to the Figures generally and with particular reference to FIG. 1 and FIG. 2, an overview of a system 100 for a computer-implemented method to rank a plurality of datasets in accordance with dataset content as carried out by a server computer 102 having optionally shared storage 104. With continued reference to FIG. 1, the server computer is in communication with a source of Process Documents 106 (e.g., BPEL, UML diagrams, etc.) that indicate desired dataset data fields. The server computer 102 includes a Process Documentation Analysis Module (PDAM) 112 that uses known UML processing and assessment tools (including diagram identifiers and other similar UML content extractors) and BPEL readers to review and mine documents to identify Target Data Fields. These Target Data Fields provide information about the format of data which is most compatible with the needs of a given user. As an example, a user may provide documents written in Business Process Execution Language (BPEL), and documents in this format can indicate the various activities, actors, and process sequences that are important to the operation of the user's business, and these aspects can be extracted to help understand the data needs of the user. As another example, a user may provide documents presented using Unified Modeling Language (UML) or similar modeling language, and documents in this format can provide insight about the software artifacts important to operation of the user's processing systems, including class diagrams, activity diagrams, and sequence diagrams. Activities from the BPEL documents can be matched to the UML diagrams and used to extract class level components of the user system. The server computer 102 uses the extracted class level components to determine data field requirements.

The server computer 102 is also in communication with a source of Data Use Documents 108 (e.g., such as data requirement questionnaires) that indicate desired dataset attributes. The server computer 102 is also in communication with a source of one or more datasets 110.

The server computer 102 includes Data Use Document Analysis Module (DUDAM) 114 to assess data use documents to identify Target Dataset Attributes. A user may provide information about expected data use in a variety of ways (e.g., through detailed questionnaire responses, providing groups of anticipated questions, specifying topics of interest, etc.), and this information indicates what scope of data content will be most compatible with the needs of the user. According to aspects of the invention, this information provides input regarding business requirements, so that matching data content may be identified as such when encountered in various dataset. For example, if a user wants to gain insight about marketing a particular product in a given region, datasets that contain information about sales of that product in that region would likely be more valuable than datasets that only included sales information of that product in a different region. General sales information about the product might also be valuable to this user, and user data use requirement inquiries may be structured to gather this level of detail, according to aspects of the present invention. According to aspects of the present invention, a wide variety of preferences regarding data scope can be collected from a user in order in train the system 100 regarding user data use preferences.

The server computer 102 includes Metadata Generation Module (MGM) 116 that uses (e.g., an ontology engine, statistical data processers, or similar known tools) to extract and generate dataset attribute identifying metadata. For example, the server computer 102 may use domain specific ontologies that include machine readable statements about the domain (e.g., describing various domain concepts and the relationships among them) to assign meanings for fields in a given dataset. The MGM 116 may also receive simple key value pairs that indicate field meaning. Other meaning assignment arrangements chosen in accordance with the judgment of one skilled in this field may also suffice. The generated metadata can include many kinds of useful information about the data contained in a given dataset. Derived metadata may, for example, include statistical properties of the data such as the type of distribution contained, mean values, data value variance. Derived metadata may also include indications of time series data and other similar and a variety of other data field correlations. According to aspects of the invention, derived metadata can also include information (as derived through known data mining techniques) about how the data has been used previously and what other inquiries it has supported. Derived metadata may also provide (when affirmative original content provider consent is confirmed) personally identifiable information that can be useful for marketing of products and opening new marketing channels or otherwise allowable, in accordance with the confirmed consent provided. Derived metadata may include information about the content demographic representations found within the data, including topical domain, and aggregated gender, age group, geographic distribution, and so forth. The derived metadata of a given dataset presents a summary of the dataset content and provides an indication of the data uses for which the dataset is well-suited. For example, derived metadata may indicate that a given dataset is well suited to answer questions about a certain domain, certain demographic ranges, geographically-relevant questions, and so on. The more well-suited a dataset is for a given data use, the more value the dataset has for a user with those data use goals.

The server computer 102 includes Dataset Field Suitability Assessment Module (DFSAM) 118 that identifies datasets that have a Field Suitability Value (FSV) that exceeds a predetermined suitability threshold value. The FSV is calculated by fields indicated by derived metadata for a given dataset 110 against the target data fields determined by the PDAM 112 to determine a number of matches between the fields contained in the dataset and the preferred target data fields. The FSV indicates a degree of similarity between dataset fields and the target data fields that can be measured for example, by number of class labels having semantic similarity to the target data fields of greater than 85% or some other value selected in accordance with the judgement of one skilled in this field. To increase downstream computational efficiency, the (DFSAM) 118 determines a top-k candidate datasets that have an FSV greater that the suitability threshold value and designates those candidate datasets as comparison datasets.

The server computer 102 includes Compared Attribute Assessment Module (CAAM) 120 that compares the dataset metadata of the comparison datasets identified by the (DFSAM) 118, to generate a compared attribute score value (CASV) for each compared datasets that represents a degree of likelihood that each associated compared dataset has content exhibiting the target dataset attributes. The CASVs are determined for example, by determining a number of dataset attributes have attribute semantic similarity to said target dataset attributes of greater than 85% (or some other value selected in accordance with the judgement of one skilled in this field). The server computer 102 includes a Candidate Dataset Ranking Module (CDRM) 122 that ranks candidate dataset metadata sets according to target attributes and generates a ranked list of candidate datasets, indexed by the score value. It is noted that various dataset attributes, may have different impact weights when applied to different data use documents 108, and these various attribute impact weights may be represented as a dataset attribute desirability value associated with the various fields or other attributes included in the determined metadata. The server computer 102 includes a highest ranked dataset selector that designates a compared dataset having a highest compared attribute score value as a selected dataset.

As an example, according to aspects of the invention, assessment of metadata for two comparison datasets may show that dataset has content exhibiting the target dataset attributes (e.g., "dataset value range" and "dataset completeness"). If the "dataset value range" attribute has a user indicated (e.g., via data use documents) dataset attribute desirability value that is higher (e.g., more useful to a given user) than the "dataset completeness" attribute, then a dataset with a higher "dataset value range" score (e.g., a broader range of values) will be ranked as more suitable for meeting the needs and preferences of the associated user than a dataset with a lower value range score value (e.g., a smaller range of values). In the same example, a dataset with a higher "dataset completeness" score, might not be ranked as more suitable, because the "dataset completeness" attribute is not as important as "dataset value range". In this example, having a relatively higher score for the low-weighted "dataset completeness" attribute, as compared to other datasets, is not enough to ensure a high ranking for the associated dataset. However, in this example, it still possible that the dataset associated with a relatively high "dataset completeness" attribute score may be highly ranked by the CDRM 122 if that dataset is shown to have a set of attribute scores that are on average higher that is higher than an average attribute score value of other compared datasets.

The server computer 102 also includes a Historic Use Log Update Module (HULUM) 124 that updates a historic data field so future uses of the selected dataset are evaluated with a higher degrees of accuracy provided by historical context. According to aspects of the invention, the historic use field in the metadata set associated a dataset selected for searching with a search context value that represent aspects of the search parameters and is updated with search parameters each time the dataset is the selected dataset. According to aspects of the invention, it is noted that data and its historic utilization in different business application can be tracked (e.g., by HULUM 124 and the selected dataset metadata and historic use update module 126) and used to develop rich metadata (as shown schematically at 440 in FIG. 4). For instance, ongoing data use of business applications can be used to identify associated domains of data use and the frequency of utilization. This can be added back to the data sets as metadata (e.g., via HULUM 124 and the selected dataset metadata and historic use update module 126) and future searches can be based on this ever expanding collection of metadata content. It is known to search datasets using dataset content. According to aspects of the invention, facets (e.g., Target Dataset Attributes) are including as dataset search criteria. For example, a facet called "number of null set entries" might capture the number of empty (e.g., null set) fields present in each record of a given dataset. According to aspects of the invention, having facets identified within metadata allows a user to indicate a preference (e.g., indicate a high attribute desirability value) for datasets exhibiting that facet. For example, if the needs of a given user indicate a preference for datasets with a low number of null set record entries, datasets with relatively low numbers of null set record entries will be ranked higher (e.g., more suitable for the user and more likely to meet the data requirements needs and preferences of the user) by CDRM 122 than datasets with more null set record entries. It is also possible, according to aspects of the invention, to directly identify certain target dataset attributes (e.g., facets) as requirements for identification of a dataset as a selected dataset.

Now with reference specifically to FIG. 2, and to other figures generally, a method to rank a plurality of datasets in accordance with dataset content and desired data attributes according to aspects of the invention. The server computer 102 via PDAM 112 at block 202 identifies, a set of target data fields from a set of process documents using Diagram Identifiers, BPEL readers, and UML assessment tools (as described above) to review and mine documents to identify Target Data Fields.

The server computer 102 via Data Use Document Analysis Module DUDAM 114 at block 204 identifies a set of target dataset attributes from a set of data use documents (as described above). The server computer 102 via Metadata Generation Module (MGM) 116 generates at block 206 a plurality of metadata sets for and associated plurality of datasets. The server computer 102 via DFSAM 118 at block 208 determines candidate datasets having a field suitability value that exceeds a predetermined suitability threshold value; the field suitability value (FSV) representing a degree of similarity between a set of fields associated with said dataset (via derived metadata information) and the set of target data field. The server computer 102 determines, via CAAM 120 at block 210, a likelihood of each comparison dataset exhibiting target dataset attributes.

The server computer 102 via CDRM 122 at block 212 ranks the candidate datasets based, at least in part, on said compared attribute score value. The server computer 102 via selected dataset metadata and historic use update module 126 at block 214 and block 216 establishes a set of search parameters for a search to be conducted on the selected dataset; and updates a historic use field in the metadata set associated with the selected dataset for searching with a search context value that represent aspects of the search parameters. The server computer 102 via Selected Dataset Presenter 128 at block 218 present the selected dataset 218. According to aspects of the invention, the search context value may be a numerical code that provides information about domains in which particular datasets have been used previously. The search context value may also be an unstructured text string and could represent other previous use (including other datasets used cooperatively) aspects for datasets provided.

Figure 3A:
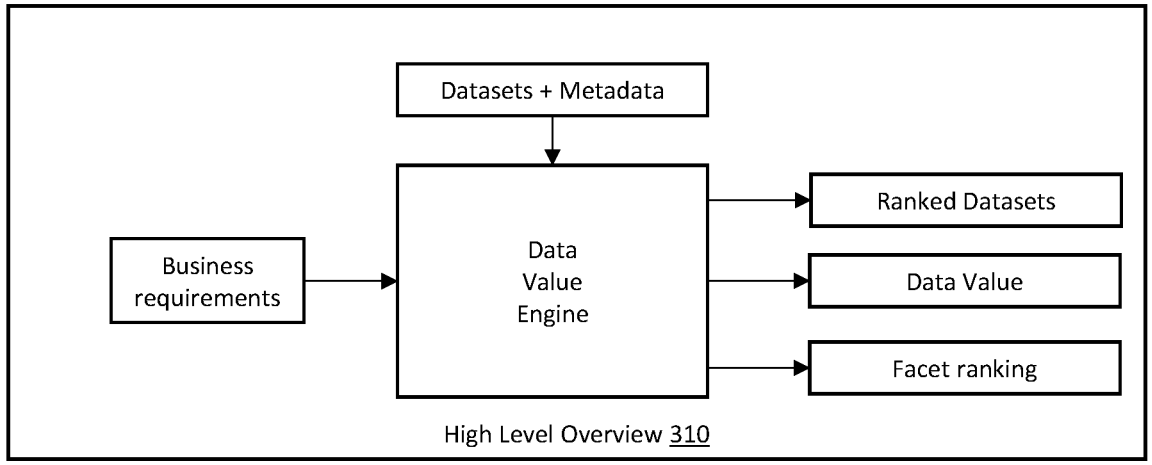
FIG. 3A is an alternate view of aspects of the system shown in FIG. 1.

Now with reference to FIG. 3A, a high level overview 310 of the system 100 is shown. In particular, business requirements, datasets, and metadata are provided as input, to data value engine for processing. According to aspects of the invention, the data value engine provides ranked datasets, data value, and facet ranking as output. According to aspects of the invention, metadata includes information about the data of a given dataset (e.g., for instance, a domain associated with a given dataset). The metadata can be stored in different forms along with the data. In many object storage arrangements, data is stored as objects, and metadata is stored a key-value pairs associated with the data objects. Metadata is primarily identified (e.g., extracted with automated mechanisms, such as analysis algorithms or similar routines selected by one skilled in this field) from within the data itself or manually, with input from data experts that provide additional insight and information about the various data objects. According to aspects of the invention, score are numerical value that represent the relative importance of a facet (e.g., attribute or feature) in the metadata. Facets are a data property either derived through automation or added to the dataset as part of input provided by a domain expert. If two datasets are available, the dataset better for a specific requirement of an application is the dataset with a higher score. According to aspects of the invention, we preferably generate scores and rank datasets according to content field attributes and the presence of preferred dataset attributes (e.g., facets). Ranking identifies among all the features the relative importance of a given facet for a given dataset. Rank also determines the relative placement of various facets when the suitability of datasets are established for the data needs of a given user. For example, a dataset score for "null value" attribute will indicate many null set records are in the associated dataset. In turn, the server computer 102 will use the score for each attribute and rank (e.g., via CDRM 122) the attributes across various compared datasets, and within each dataset, as well.

Figure 3B:
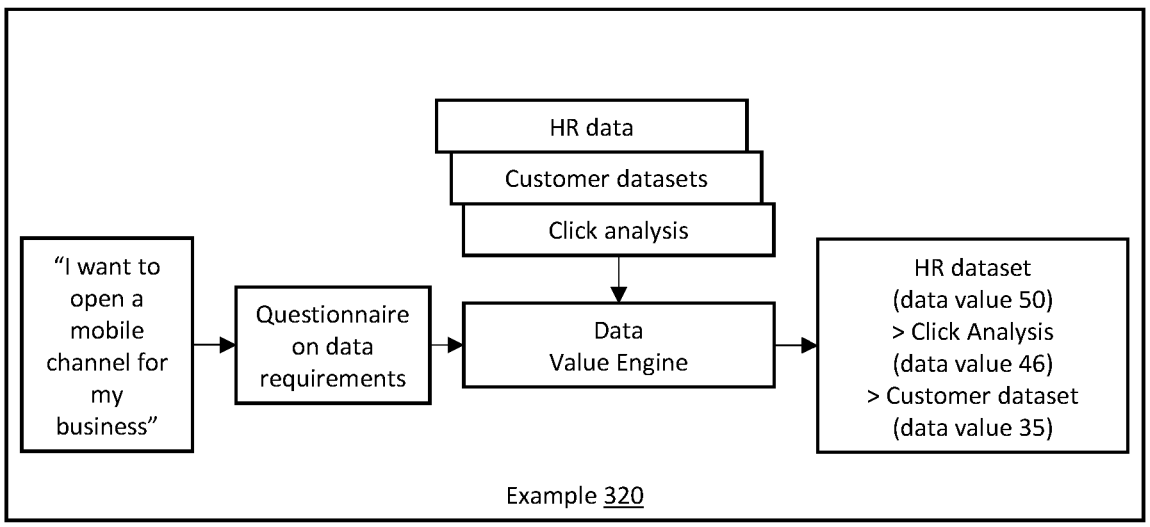
FIG. 3B is a schematic representation of aspects of the system shown in FIG. 1 in use to provide a set of ranked datasets, according to embodiments of the present invention.

Now with reference to FIG. 3B, a schematic representation 320 of an example of the system 100 in use is shown. In particular, a request for a certain kind of information (represented by a question or a group of questions arranged into a questionnaire, and other data requirements) is passed to a data value engine. Several datasets (e.g., "HR data", "customer datasets", and "Click analysis") and associated dataset metadata are also provided to the data value engine. The data value engine processes the input, evaluates the provided datasets according to suitability, and provides a list of the datasets ranked according to the determined suitability. In the example shown, the "HR data" dataset it the top-ranked dataset, with a determined data value of 50; the "Click analysis" dataset is the mid-ranked dataset, with a determined data value of 46; and the "Customer" dataset is the lowest-ranked dataset, with a determined data value of 35.

Figure 4:
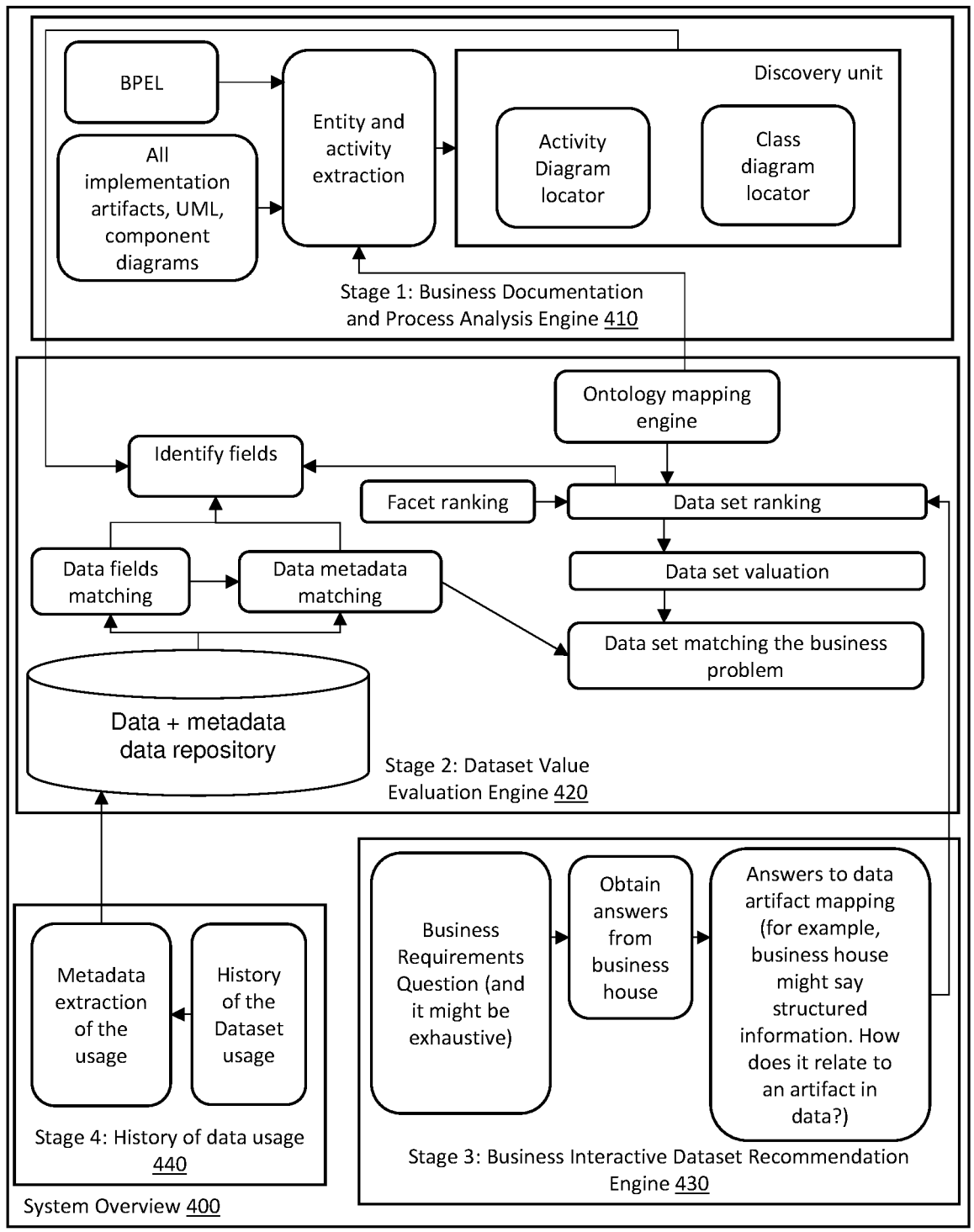
FIG. 4 is a schematic overview of the system shown in FIG. 1, with aspects of the system arranged into multiple stages.

Now with reference to FIG. 4, a schematic overview of the system 100 shown with aspects of the system arranged into multiple stages will be discussed. In particular, a first stage 410 represents aspects of an embodiment of the invention known collectively as "Stage 1: Business Documentation and Process Analysis Engine," in which BPEL documents, implementation artifacts, UML, and various component diagrams are processed for entity and activity extraction. A discovery unit associated with the first stage 410 includes an activity diagram locator and a class diagram locator suited for identifying fields necessary to support system activity in accordance with the established practices and requirements of a given user, as represented in the process documents provided as input. A second stage 420 represents aspects of an embodiment of the invention known collectively as "Stage 2: Dataset Value Evaluation Engine," in which various field requirements and desired dataset traits, including target fields identified in first stage 410 and dataset target attributes (e.g., dataset facets) identified in a third stage 430 (described more fully below) are compared using known NLP, machine learning comparisons, and other methods of computerized analysis, against sets of metadata that each describe provided datasets. A dataset suitability value is determined for each dataset, and the datasets are ranked according to these values. A third stage 430 represents aspects of an embodiment of the invention known collectively as "Stage 3: Business Interactive Dataset Recommendation Engine," in which various business requirement questions, associated answers, and related system artifact mapping is passed along to the dataset evaluation engine 420 for use as described above. A fourth stage 440 represents aspects of an embodiment of the invention known collectively as "Stage 4: History of data usage," in which past, recorded dataset usage and extracted metadata describing the usage are passed to the second stage 420 for supplemental consideration when determining dataset suitability values. In particular, the output of the fourth stage 440 provides historic perspective and an associated increase in score accuracy by allowing the evaluation engine of the second stage 420 to include metadata of past dataset uses and historic score values. This stage provides an ever-increasing perspective to the system over multiple iterations of use, allowing the system 100 to become more accurate with increased use.

Figure 5:
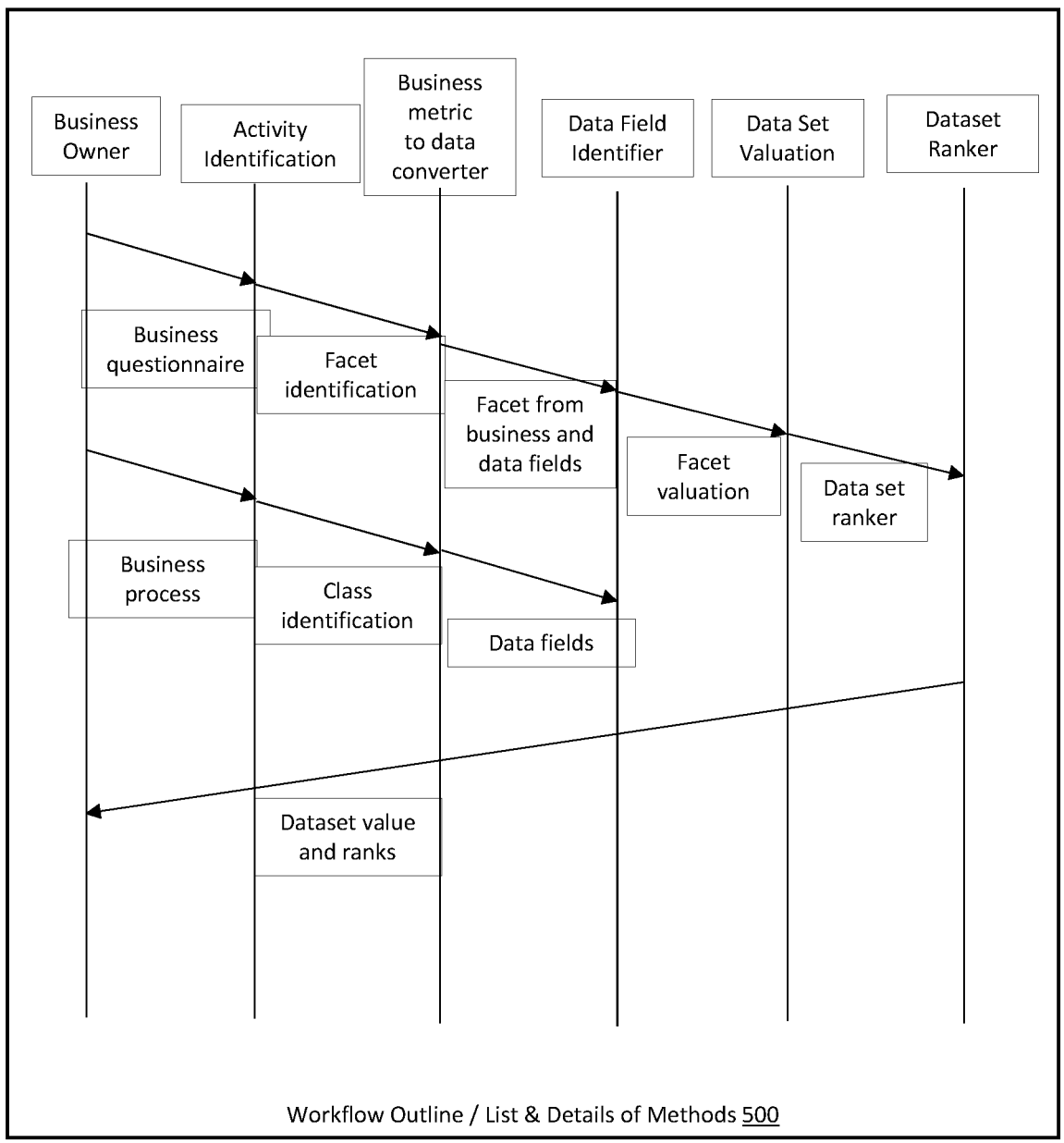
FIG. 5 is an alternate view of the system shown in FIG. 1, with aspects of the system arranged according to a workflow outline, including a list of methods and related details.

Now with reference to FIG. 5, an alternate view of the system 100 shown with aspects of the system arranged according to an exemplary workflow outline 500. In particular, business questionnaire information and business process information are passed from a business owner to an activity identification phase, in which target data facets and required system classes are identified. A business metric to data converter then provides required facets from business and data fields to a data field identifier, and a facet valuation is generated. The facet valuation is passed to a dataset valuation phase, in which a dataset ranker provides a ranking of the datasets. This information is then passed back to the business owner as output.

Now with reference to FIG. 6, a schematic representation 600 of aspects of a sample embodiment of "datavalue" entry and a "dataranking" entry generated according embodiments of the present invention. In particular, the entries provide an indication of a set of JSON-formatted key-value pairings useful to identify and compare dataset values and associated dataset ranking in accordance with aspects of the invention. It noted that other formats may be selected in accordance with the judgement of one skilled in this field.

Now with reference to FIG. 7, an exemplary questionnaire 700 (and sample answers) regarding business requirements for an accounting scenario that is assessing account attrition is shown. The server computer 102 collects and processes answers (e.g., via DUDAM 114). The kind of information the associated business might prefer to gather is reflected in the answers provided in response to the questionnaire questions. The answers provided by the user associated with the business are used to determine target dataset attributes.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
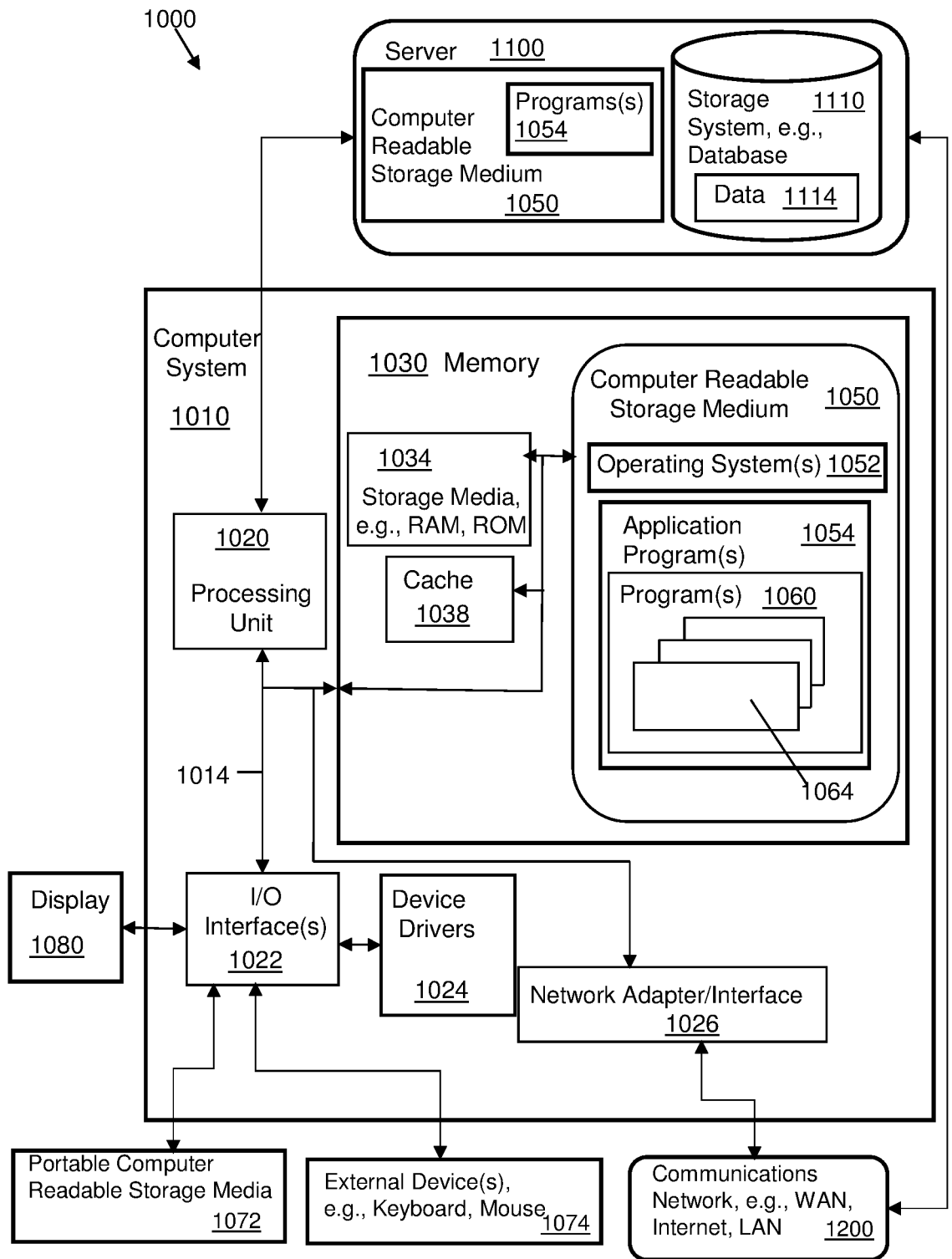
FIG. 8 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 8, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
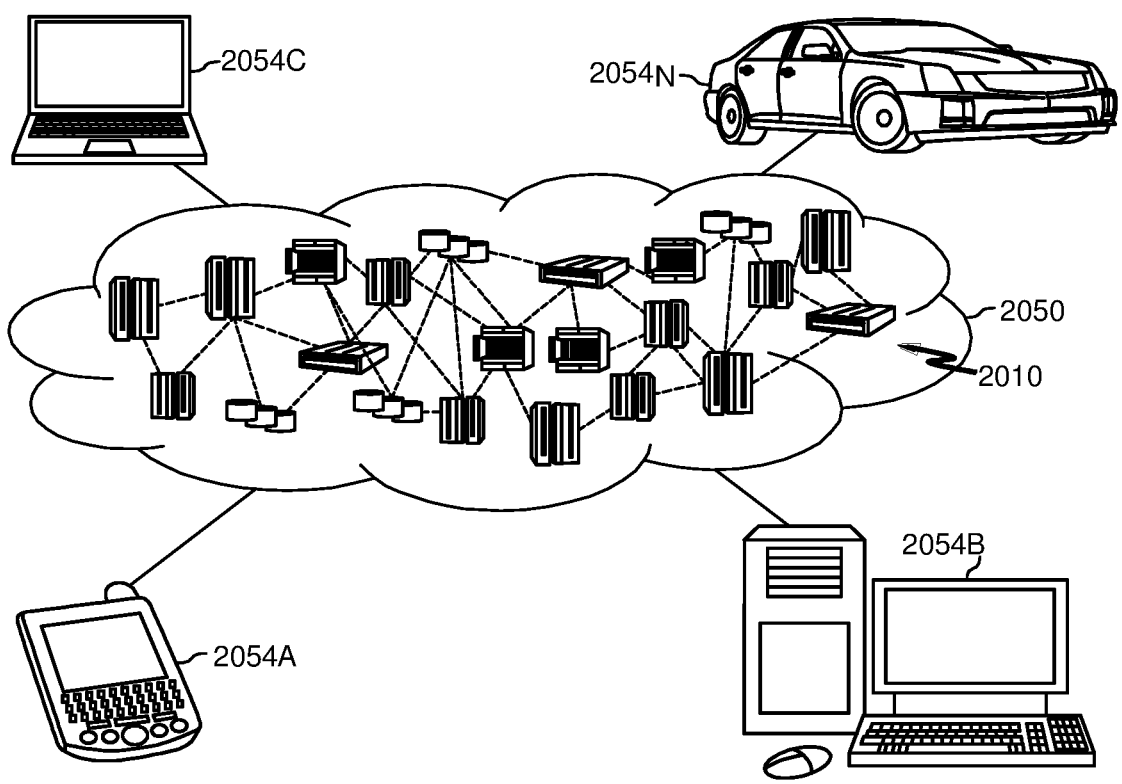
FIG. 9 depicts a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
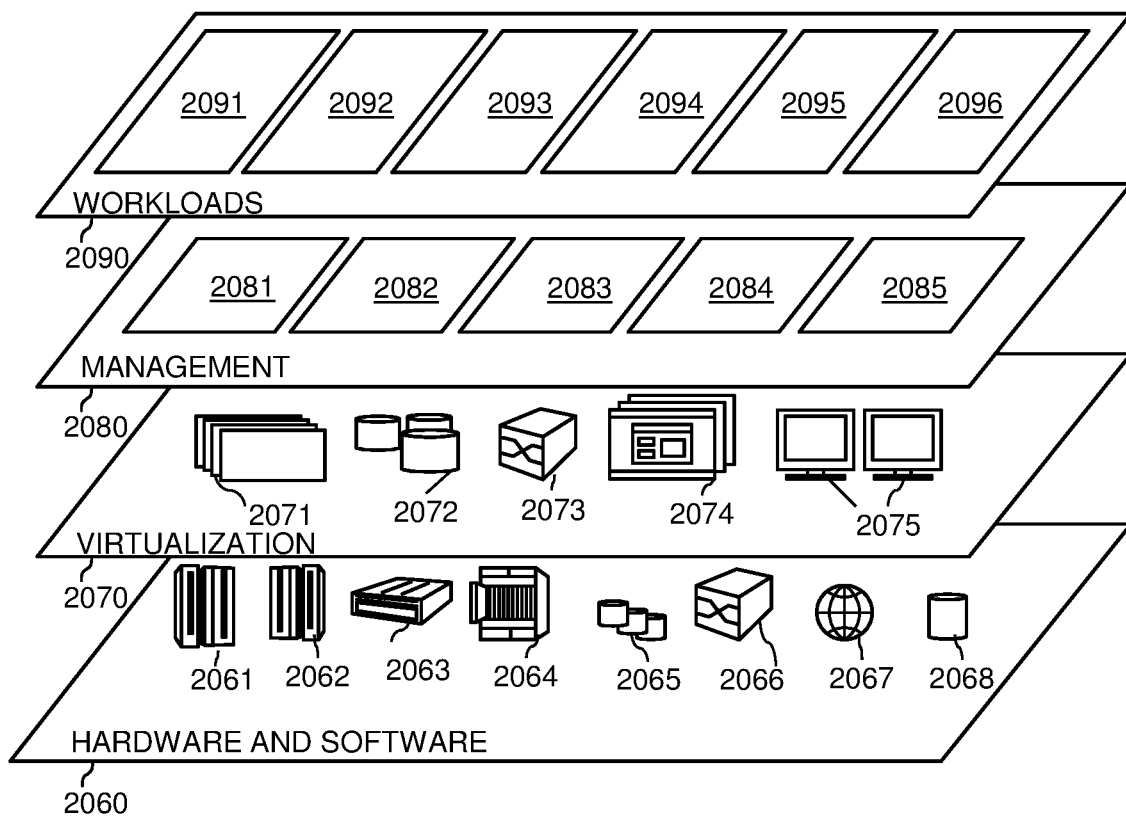
FIG. 10 depicts abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and an automatic method to rank a plurality of datasets in accordance with dataset content and desired data attributes 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to sort a plurality of datasets according to dataset attributes, comprising:
identifying, by a computer, a set of target data fields from a set of process documents, said process documents indicating data field preferences of a user;
identifying, by said computer, a set of target dataset attributes from a set of data use documents, said data use documents indicating data scope preferences for said user, attributes include a data property either derived using automation or added to the set of the target dataset attributes as part of an input provide by a domain expert;
generating, by a computer, a plurality of metadata sets for an associated plurality of datasets;
determining, by said computer, candidate datasets having a field suitability value that exceeds a predetermined suitability threshold value, said field suitability value representing a degree of similarity between a set of fields associated with said dataset and the set of target data fields;
assessing, by said computer, the associated metadata set for each candidate dataset, with regard to the target attributes and generating, by said computer, a compared attribute score for each candidate dataset, indicating a degree of likelihood that an associated dataset will have content exhibiting said target dataset attributes; and
generating, by said computer, a list of said candidate datasets sorted by said compared attribute scores.

2. The method of claim 1, wherein said data use documents include information in a format selected from a list consisting of Business Process Execution Language (BEPL), and Unified Modeling Language (UML).

3. The method of claim 1, wherein said data target attributes are extracted from elements of said process documents, selected from a list consisting of class diagrams, activity diagrams, sequence diagrams, and component diagrams.

4. The method of claim 1, further including designating a candidate dataset having a highest compared attribute score as a selected dataset.

5. The method of claim 4, further including establishing a set of search parameters for a search to be conducted on said selected dataset; and updating a historic use field in the metadata set associated with a dataset selected for searching with a search context value that represent aspects of the search parameters.

6. The method of claim 5, wherein said ranking is based, at least in part, on the historic use field values.

7. The method of claim 1, wherein said compared attribute scores are based, at least in part on an associated desirability value associated with each of said target dataset attributes.

8. The method of claim 1, wherein said sets of metadata include information selected from a list consisting of: domain, gender, age group, geographic distribution, demographic distribution, statistical ranges of numerical values, and context of applicability.

9. system to sort a plurality of datasets according to dataset attributes, which comprises:
a computer system comprising a computer readable storage medium having program instructions embodied therewith, the program instructions executable by a computer to cause the computer to:
identify a set of target data fields from a set of process documents, said process documents indicating data field preferences of a user;
identify a set of target dataset attributes from a set of data use documents, said data use documents indicating data scope preferences for said user, attributes include a data property either derived using automation or added to the set of the target dataset attributes as part of an input provide by a domain expert;
generate a plurality of metadata sets for an associated plurality of datasets;
determine candidate datasets having a field suitability value that exceeds a predetermined suitability threshold value, said field suitability value representing a degree of similarity between a set of fields associated with said dataset and the set of target data fields;
assess the associated metadata set for each candidate dataset, with regard to the target attributes and generating, by said computer, a compared attribute score for each candidate dataset, indicating a degree of likelihood that an associated dataset will have content exhibiting said target dataset attributes; and
generate a list of said candidate datasets sorted by said compared attribute scores.

10. The system of claim 9, wherein said data use documents include information in a format selected from a list consisting of Business Process Execution Language (BEPL), and Unified Modeling Language (UML).

11. The system of claim 9, wherein said data target attributes are extracted from elements of said process documents, selected from a list consisting of class diagrams, activity diagrams, sequence diagrams, and component diagrams.

12. The system of claim 9, further including instructions for the computer to designate a candidate dataset having a highest compared attribute score as a selected dataset.

13. The system of claim 12, further including instructions for the computer to establish a set of search parameters for a search to be conducted on said selected dataset; and to update a historic use field in the metadata set associated with a dataset selected for searching with a search context value that represent aspects of the search parameters.

14. The system of claim 13, wherein said ranking is based, at least in part, on the historic use field values.

15. The system of claim 9, wherein said compared attribute scores are based, at least in part on an associated desirability value associated with each of said target dataset attributes.

16. The system of claim 9, wherein said sets of metadata include information selected from a list consisting of: domain, gender, age group, geographic distribution, demographic distribution, statistical ranges of numerical values, and context of applicability.

17. computer program product to sort a plurality of datasets according to dataset attributes, the computer program product comprising a computer readable storage medium having program instructions embodied therewith, the program instructions executable by a computer to cause the computer to:
identify, using a computer, a set of target data fields from a set of process documents, said process documents indicating data field preferences of a user;
identify, using a computer, a set of target dataset attributes from a set of data use documents, said data use documents indicating data scope preferences for said user, attributes include a data property either derived using automation or added to the set of the target dataset attributes as part of an input provide by a domain expert;

generate, using a computer, a plurality of metadata sets for an associated plurality of datasets;

determine, using a computer, candidate datasets having a field suitability value that exceeds a predetermined suitability threshold value, said field suitability value representing a degree of similarity between a set of fields associated with said dataset and the set of target data fields;

assess, using a computer, the associated metadata set for each candidate dataset, with regard to the target attributes and generating, by said computer, a compared attribute score for each candidate dataset, indicating a degree of likelihood that an associated dataset will have content exhibiting said target dataset attributes; and generate, using a computer, a list of said candidate datasets sorted by said compared attribute scores.

18. The computer program product of claim 17, wherein said data use documents include information in a format selected from a list consisting of Business Process Execution Language (BEPL), and Unified Modeling Language (UML).

19. The computer program product of claim 17, wherein said data target attributes are extracted from elements of said process documents, selected from a list consisting of class diagrams, activity diagrams, sequence diagrams, and component diagrams.

20. The computer program product of claim 17, further including instructions for the computer to designate a candidate dataset having a highest compared attribute score as a selected dataset.

* * * * *